UNITED STATES PATENT OFFICE.

MAX HESSENLAND, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

ALIZARIN-RED VAT DYESTUFF AND PROCESS OF MAKING SAME.

1,023,847. Specification of Letters Patent. Patented Apr. 23, 1912.

No Drawing. Application filed November 21, 1910. Serial No. 593,539.

*To all whom it may concern:*

Be it known that I, MAX HESSENLAND, Ph. D., chemist, a citizen of the Empire of Germany, residing at Höchst-on-the-Main, Germany, have invented certain new and useful Improvements in Alizarin-Red Vat Dyestuffs and Processes of Making Same, of which the following is a specification.

I have found that valuable alizarin-red vat dyestuffs are obtained by treating 5-halogen-2-carboxy-aryl-1-aminoanthraquinones with dehydrating agents such as chlorosulfonic acid. The constitution of the new dyestuffs and their relation to the parent products is apparent from the following formulæ.

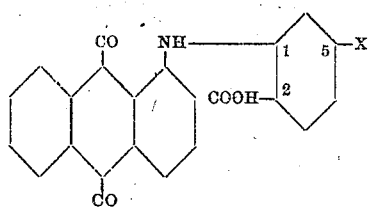

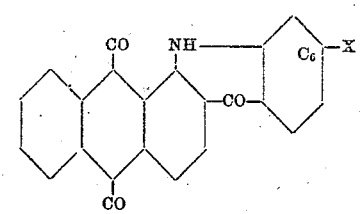

wherein X stands for a halogen atom and $C_6$ for an aryl residue, and they can be designated as 4-Bz-halogen-anthraquinone-1.2-acridones. These dyestuffs are yellowish-red powders, insoluble in the usual organic solvents but capable of being recrystallized from nitrobenzene; they dissolve in concentrated sulfuric acid with a brown color. When treated with alkaline hydrosulfite, they yield violet vats which give on cotton fast dyeings of tints like the alizarin red.

Example: 10 parts of 5-chloro-2-carboxyphenyl-1-aminoanthraquinone, obtainable by treating chloroaminobenzoic acid $$(NH_2 : COOH : Cl = 1 : 2 : 5)$$

with α-chloroanthraquinone, are introduced at 25° C. into 200 parts of chlorosulfonic acid and stirred for half an hour at the said temperature. The mass is then poured on ice for separating the dyestuff. When dry it forms a yellowish-red powder which is not soluble in the usual solvents and which can be recrystallized from nitrobenzene. On treating it with alkaline hydrosulfite the dyestuff yields a violet vat which dyes cotton and produces on oxidation in the air a yellowish-red color of the tint of the Turkey-red and of excellent fastness.

In an analogous manner can be obtained, for instance, the anthraquinone-bromo-acridone, being of the same constitution and possessing very similar properties.

Having now particularly described my invention what I claim is:

1. As new products, the vat-dyestuffs being the 4-Bz-halogen-anthraquinone-1.2-acridones of the constitution:

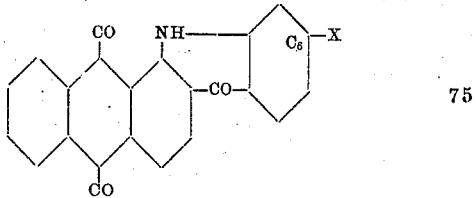

wherein $C_6$ stands for an aryl residue and X for a halogen atom, being yellowish-red powders, insoluble in water, alcohol, ether, benzene, soluble in hot nitrobenzene, dissolving in concentrated sulfuric acid to yellowish-brown solutions, and in alkaline hydrosulfite to violet solutions, and dyeing from the vat cotton fast tints like those of the alizarin-red.

2. As a new product, the vat-dyestuff being the 4-Bz-chloroanthraquinone-acridone of the constitution:

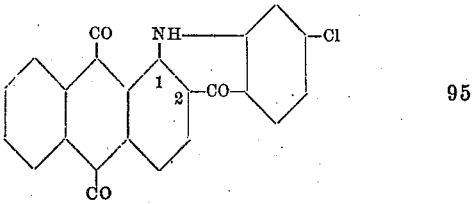

being a yellowish-red powder, insoluble in water, alcohol, ether, and benzene, soluble in hot nitrobenzene, dissolving in concentrated sulfuric acid to a yellowish-brown solution, in alkaline hydrosulfite to a violet solution, and dyeing from the vat cotton fast tints like those of the alizarin-red.

3. The process, consisting in treating 5-chloro-2-carboxy-aryl-1-aminoanthraquinone with chlorosulfonic acid.

In testimony whereof, I affix my signature in presence of two witnesses.

MAX HESSENLAND.

Witnesses:
 JEAN GRUND,
 CARL GRUND.